United States Patent [19]

Kirkland

[11] Patent Number: 4,952,938
[45] Date of Patent: Aug. 28, 1990

[54] WIRE DETECTOR

[75] Inventor: James L. Kirkland, Panama City, Fla.

[73] Assignee: The United States of America as represented by the Secretary of the Navy, Washington, D.C.

[21] Appl. No.: 650,217

[22] Filed: Jan. 16, 1976

[51] Int. Cl.⁵ .............................................. G01S 13/00
[52] U.S. Cl. ........................................ 342/22; 367/12
[58] Field of Search ............. 340/4 A, 4 R, 3 T, 850; 343/709, 719, 5 NA; 367/12; 114/244; 342/22; 405/154, 155

[56] References Cited

U.S. PATENT DOCUMENTS 3,922,633  11/1975  Higgins .............................. 340/4 R Primary Examiner—Thomas H. Tarcza
Assistant Examiner—Daniel T. Pihulic
Attorney, Agent, or Firm—Harvey David; John Becker; Sol Sheinbein

[57] ABSTRACT

An underwater, towable wire detector wherein a pickup coil is carried in an R.F. (radio frequency) signal shield that is positioned by gravity to receive only those emanations receivable upwardly through an R.F. window therein.

9 Claims, 1 Drawing Sheet

WIRE DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to apparatus detecting the presence and location of a conductor which extends on opposite sides of an air/water boundary, for example in the case of a command control wire leading from a location on a bank of a body of water to an explosive mine situated under the water. More particularly, the invention is directed to an improved, towable detector device for use in such systems that rely upon operation of the wire to be detected as an antenna. As is discussed in my copending Pat. application Ser. No. 354,560, filed Apr. 20, 1973, and assigned to the assignee hereof, radio broadcast signals are readily picked up by the above water portion of the wire and retransmitted by the underwater portion. An antenna coil, connected to a radio receiver and towed underwater so as to come into close proximity to the wire, serves as a detector of the retransmitted radio waves and hence of the wire. When the water concerned is salt or brackish the radio waves from the primary transmitter are sufficiently attenuated to prevent their interference with, or masking of, the reception of the secondary transmissions from the wire. That is to say the salt or brackish water serves as a radio frequency shield for the detector. Now, since the attenuation is a function of water depth and the electrical conductivity of the water, the shielding effect of fresh water has been found to be insufficient in some circumstances to prevent masking of or interference with the retransmitted signals with resulting loss of ability to accurately detect the presence of the wire.

Moreover, detectors used heretofore have generally required a specific orientation of the towed body in order to maintain the detector coil or antenna in its most sensitive attitude relative to a wire lying on a substantially horizontal bottom surface. To accomplish this, various wing or vane configurations have been provided on the towed detector body. While these have been of considerable use, they have at times become inverted and required time consuming retrieval and righting procedures, and have generally made the towed body difficult to handle, subject to snags, and the like.

SUMMARY OF THE INVENTION

The invention aims to overcome most or all of the foregoing shortcomings and disadvantages of the prior art through the provision of an improved, towable, wire detector that eliminates the need for external stabilizer fins or vanes, and also provides self-positioning radio frequency shielding to permit reliable wire or object detection even in shallow, fresh water.

With the foregoing in mind, it is a principal object of this invention to provide a novel and improved, towable, underwater wire detection apparatus.

Another object of the invention is to provide a towable device that houses a gravity stabilized detection element, the attitude of which is independent of roll of the body about its longitudinal or tow axis.

Still another object is to provide a towable, radio frequency signal pick-up device, that is shielded against radio frequency signals arriving from directions other than a predetermined direction.

Yet another object of the invention is the provision of a detection apparatus of the foregoing character wherein the detection element is carried in a shield that is rotatably mounted within the towable body, and is constructed with an eccentric center of gravity so that a radio energy window in the shield will automatically be maintained in an appropriate direction to admit signals to the detection element.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 2b is a longitudinal sectional view in continuation aft from FIG. 2a.

DESCRIPTION OF THE PREFERRED EMBODIMENT

Figure 1:
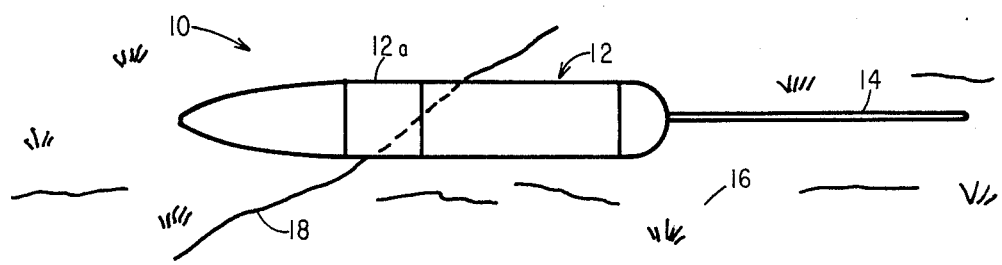
FIG. 1 is an elevational view of a wire detection apparatus embodying the invention.

In the form of the invention illustrated in the drawings and described hereinafter, a wire detection apparatus 10 comprises an elongated, streamlined hull, indicated generally at 12, adapted to be towed by a cable 14 over a ground surface 16 which is usually, but not necessarily, the bottom of a body of water. The apparatus 10 is further adapted to pick up electromagnetic radio wave signals emanating from an elongate conductor or wire 18 lying on surface 16, as the apparatus passes thereover.

The energy detector or pick-up element in this embodiment comprises a coil that is disposed within a radio wave penetrable section 12a of hull 12. The coil is shielded from undesired radio wave energy and is maintained in a predetermined attitude in a manner which will be made apparent as this specification proceeds.

Figure 2A:
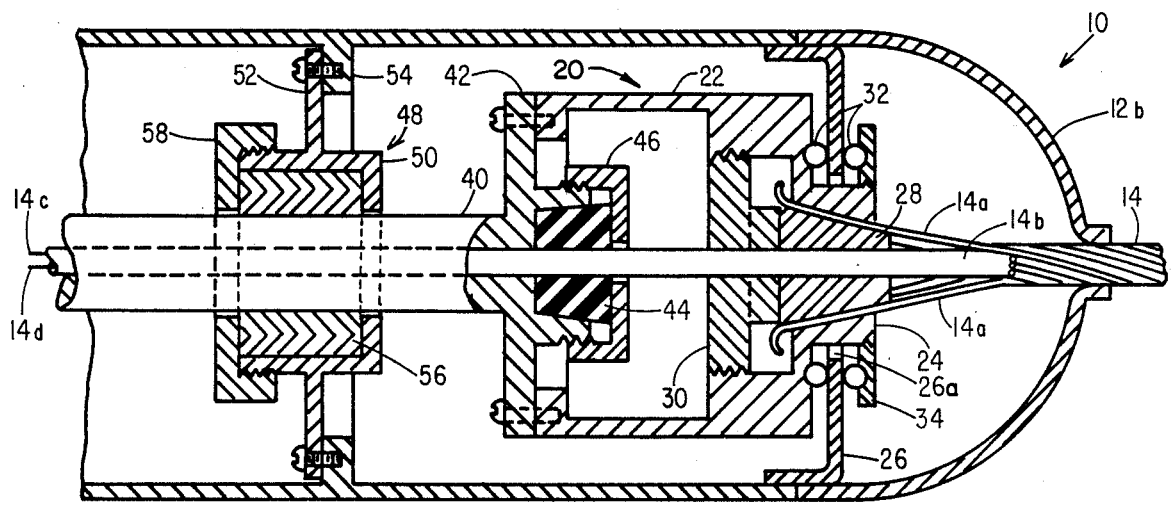
FIG. 2a is a longitudinal sectional view, on an enlarged scale, of the forward portion of the apparatus of FIG. 1.
Figure 2B:
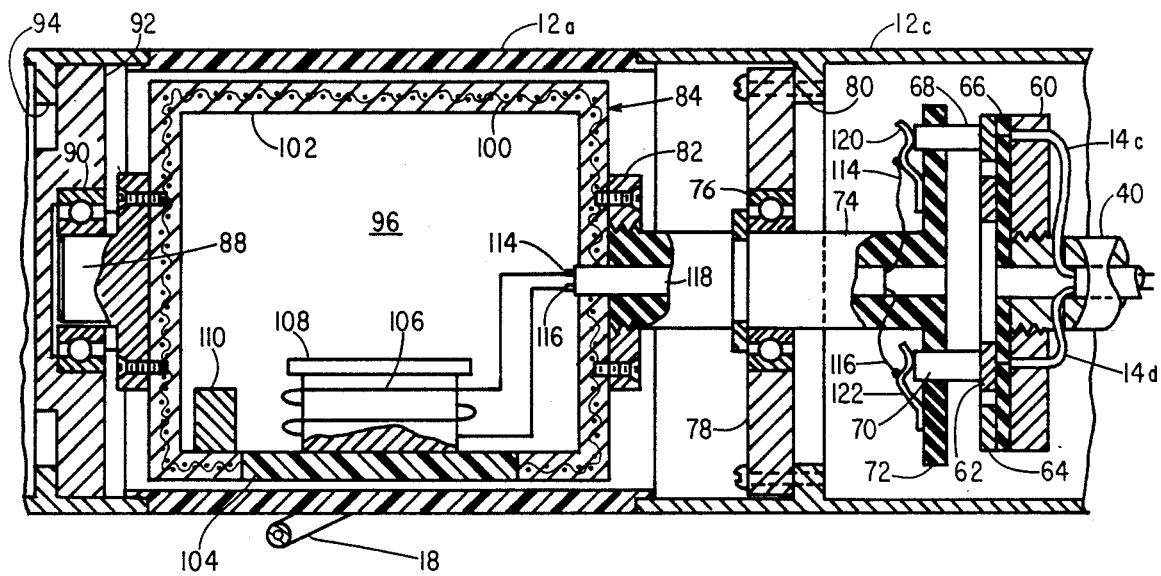

Referring now to FIGS. 2a and 2b, hull 12 includes a rounded nose section 12b followed by a cylindrical body section 12c. The walls of sections 12b and 12c are conveniently formed of metal or of some other rigid material. Section 12a, which it will be recalled is radio wave permeable or non-shielding, is formed of a suitable non-conductive plastic material.

Cable 14, which enters hull 12 through an opening in nose section 12b, comprises an outer jacket or lay of flexible wire strands 14a for strength and protection, an electrical insulation and waterproofing core 14b, and electrical conductors 14c and 14d. The hull 12 is free to rotate about its longitudinal axis relative to cable 14. To this end, there is provided within hull 12 a thrust bearing and sealing gland assembly 20 to which the cable is secured. Assembly 20 comprises a hollow cylindrical member 22 having an axial boss 24 extending through an opening 26a in a bulkhead plate 26. Boss 24 has a tapered bore in which is received a correspondingly tapered plug 28. The strands 14a of cable 14 are spread so as to be gripped between the tapered plug 28 and the tapered bore in boss 24, while the core 14b of the table, passes through an aperture in the plug.

An apertured nut 30 is threadedly engaged in member 22 and serves to urge plug 28 into tight, gripping relation to the strands 14a. Anti-friction ball elements 32 are disposed between member 22 and one side of bulkhead plate 26, and between the other side of plate 26 and a forward race member 34 fixed on boss 24.

Cable core 14b and its enclosed conductors extends aft along the longitudinal axis of hull 12 into a tubular shaft 40. The shaft 40 is provided with a radial flange 42 adjacent its forward end that is secured to the after end of body 22. A tapered plug 44, of rubber or other suitable sealing material, is compressed around core 14b by a gland nut 46 urging the plug into a tapered seat in the end of the shaft. Shaft 40, and the cable core therein, extends through a shaft seal or gland 48 comprising a packing cup 50 having a flange 52 fastened in fluid tight relation to an inwardly directed rib 54 of hull 12. Flange 52 and rib 54 comprise a bulkhead for hull strength and compartmentization. Cup 48 contains a suitable, soft, self-lubricating packing 56, confined by a nut 58 and serving to seal against leakage along shaft 40 while permitting relative rotation between the hull and the shaft.

The after end of shaft 40 is provided with a flange 60 on the after face of which are mounted a set of concentric slip-rings 62 and 64. A suitable insulating layer 66 is interposed between rings 62, 64, and flange 60. Conductors 14c and 14d are led from shaft 40 to rings 62 and 64, respectively, as shown. The slip-rings 62 and 64 cooperate with conductive brushes 68 and 70 carried in an insulatinq flange 72 at the forward end of a tubular shaft 74.

Shaft 74 is journaled in a bearing 76 in a bulkhead or bearing plate 78 secured to an inwardly directed rib 80 of hull 12, and has a flange 82 at the after end thereof that is secured in supporting relation to the forward end of a cylindrical, radio wave shield 84. The other end of the shield 84 is supported by a stub shaft 88 journalled in a bearing 90 in a bulkhead or bearing plate 92 that is secured to a hull rib 94. It will be noted that the shield 84 is located concentrically within the radio wave permeable hull section 12a.

The shield 84, which defines a cavity 96, comprises walls formed of any material known to provide good electromagnetic or radio wave shielding. Thus, in this example, the walls of shield 84 comprise, for the most part, copper mesh screening 100 molded in a plastic material 102 for rigidity. A radio wave permeable window 104 is formed conveniently of the same material as hull section 12a.

Disposed within cavity 96, and in proximity to window 104, is the previously mentioned detection element or pick-up coil, designated at 106. Coil 106 may be in any of a number of known configurations depending upon the nature (frequency, wavelength, polarization, etc.) of the emanations to be detected. A coil form or core 108 may be provided.

In the present example, coil 106 has one or more turns lying in a horizontal plane. That is to say, the coil has a vertical magnetic axis. This is well suited to the detection of emanations from a horizontal wire such as wire 18, when the apparatus 10 is towed so as to cross the wire.

Mounted on shield 84, preferably within cavity 97 thereof, is an eccentric weight 110. Weight 110 serves to assure that the action of gravity will cause shield 84 to be positioned with the window 104 therein directed downwardly.

Coil 106 has its opposite ends connected to a pair of conductors 114 and 116 that are enclosed in an insulating sheath 118. Sheath 118 and its conductors 114, 116 extend forward within tubular shaft toward the brush carrying flange 72. The conductors 114 and 116 are led from shaft 74 and connected, as shown, to brush springs 120 and 122, respectively, acting on brushes 68 and 70.

It will be recognized from the foregoing construction that, owing to the gravity responsive rotational suspension of shield 84 and coil 106 therein, the coil will always be shielded from radio wave energy arriving in directions other than generally upwardly as from wire 18. It will also be recognized that, the rotary connection of the hull to the cable will avoid any problems of cable twist. The hull 12 is subject to flooding, through the cable opening in nose section 12b, rearwardly to the shaft gland 48. Similarly the tail section of the hull, behind plate 92, may be free flooded. The spaces housing the slip-ring and brush means and housing the coil 106 and coil shield 84 are preferably dry. 0f course, a quantity of non-conductive liquid such as castor oil can be contained between plates 78 and 92 to provide an oscillation dampening function on shield 84.

Pick-up coil 106 is electrically connected through conductors 114, 116, brushes 68, 70, slip-rings 62, 66, and conductors 14c, 14d of cable 14 to suitable radio signal amplifying and processing means, usually aboard a towing vehicle. Thus, cable 14 serves both as a towing and data link.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Electromagnetic detection apparatus comprising:
    an elongated hull and a tow and data link cable attached thereto for towing of said hull in the direction of its longitudinal axis over a generally horizontal surface;
    at least a portion of said hull comprising a radio wave permeable outer wall section for substantially free rotation about said longitudinal axis relative to said hull, said shield member comprising a radio wave permeable window;
    a pick-up coil mounted within said shield member;
    coupling means for electrically connecting said pick-up coil to said cable; and
    eccentric weight means on said shield member for causing said shield member to seek a rest position with said window in a predetermined orientation whereby said coil is responsive to radio wave signals only from a predetermined direction and is shielded from signals from other directions.

2. Electromagnetic detection apparatus as defined in claim 1, and wherein:
    said coupling means comprises slip-rings and brushes.

3. Electromagnetic detection apparatus as defined in claim 1, and further comprising:
    rotational thrust bearing means, connected between said hull and said cable, for transmitting towing forces from said cable to said hull.

4. Electromagnetic detection apparatus as defined in claim 2, and further comprising:

rotational thrust bearing means, connected between said hull and said cable, for transmitting towing forces from said cable to said hull.

5. Electromagnetic detection apparatus as defined in claim 4, and further comprising a plurality of bulkhead means, fixed in said hull, for defining at least one water tight chamber therein; and said coupling means being disposed in said watertight chamber.

6. Electromagnetic detection apparatus as defined in claim 5, and further comprising:

first rotary shaft means extending from said thrust bearing means, through one of said bulkhead means, to one side of said coupling means, on said one of said bulkhead means, for sealing cooperation with said first rotary shaft means.

7. Electromagnetic detection apparatus as defined in claim 6, and further comprising:

second rotary shaft means, extending between said coupling means and said shield member for rotation therewith; and shaft bearing means rotatably supporting said second rotary shaft means.

8. Electromagnetic detection apparatus as defined in claim 7, and wherein:

said shield member comprises a cylindrical shell having walls formed of a rigid synthetic plastic material having a metallic screen embedded in radio wave shielding portions thereof.

9. An electromagnetic detection apparatus comprising:

an elongated hull adapted to be towed underwater in the direction of its longitudinal axis, said hull having a plurality of axially spaced bulkhead members, and having at least one annular section that is readily permeable by electromagnetic radio frequency waves;

a cable comprising external strength members and an internal core including first electrical conductors for electrical signal transmission, said cable extending through an axial opening in said hull to the interior thereof;

a thrust bearing mounted on a first of said bulkhead members; said core extending through said thrust bearing and said strength members being fixed to said thrust bearing;

a first tubular shaft connected to said thrust bearing and extending through a second of said bulkhead members;

said core extending through said first tubular shaft;

a first sealing gland mounted on a second of said bulkhead members and surrounding said first tubular shaft;

a second tubular shaft in axial alignment with said first tubular shaft and supported for rotation relative to said hull about said longitudinal axis;

second electrical conductors extending through said second tubular shaft;

slip-ring and brush means, cooperatively mounted on said first and second tubular shafts and electrically interconnecting said first and second electrical conductors;

a cylindrical shield member supported by said second tubular shaft for rotation within said annular hull section about said longitudinal axis, said shield member having a conductive shield portion and a non-conductive window portion;

a radio wave detector element mounted in said shield member and electrically connected to said second conductors; and a weight mounted on said shield member and eccentrically located so that said shield member and said detector element seek a predetermined rotational position, whereby said detector element is shielded from radio waves impinging on said hull from directions other than a predetermined direction of interest, and is exposed to radio waves impinging on said hull from said predetermined direction of interest.

* * * * *